Figure 1:
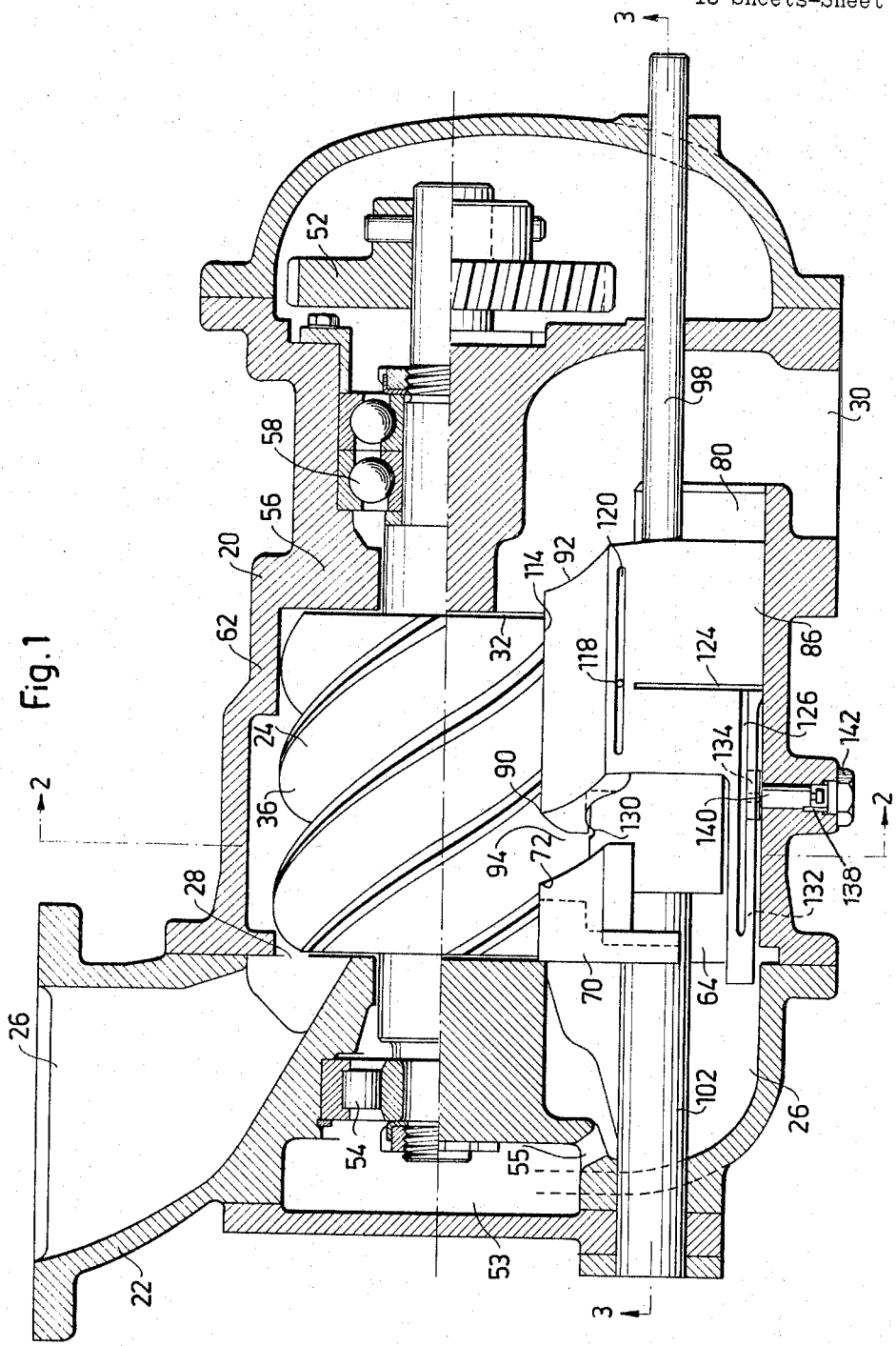

April 18, 1967 L. B. SCHIBBYE 3,314,597
SCREW COMPRESSOR

Filed March 16, 1965 13 Sheets-Sheet 1

INVENTOR

Lauritz Benedictus Schibbye

BY his ATTORNEY

April 18, 1967     L. B. SCHIBBYE     3,314,597
SCREW COMPRESSOR

Filed March 16, 1965     13 Sheets-Sheet 2

April 18, 1967  L. B. SCHIBBYE  3,314,597
SCREW COMPRESSOR

Filed March 16, 1965  13 Sheets-Sheet 8

INVENTOR
Lauritz Benedictus Schibbye
BY
James O. Marlee
his ATTORNEY

April 18, 1967   L. B. SCHIBBYE   3,314,597
SCREW COMPRESSOR

Filed March 16, 1965   13 Sheets-Sheet 10

INVENTOR

April 18, 1967 L. B. SCHIBBYE 3,314,597
SCREW COMPRESSOR
Filed March 16, 1965 13 Sheets-Sheet 12

INVENTOR

BY

ATTORNEY

April 18, 1967 L. B. SCHIBBYE 3,314,597
SCREW COMPRESSOR

Filed March 16, 1965 13 Sheets-Sheet 13

INVENTOR
Lauritz Benedictus Schibbye

BY
ATTORNEY

United States Patent Office 3,314,597
Patented Apr. 18, 1967

3,314,597
SCREW COMPRESSOR
Lauritz Benedictus Schibbye, Saltsjo-Duvnas, Sweden, assignor to Svenska Rotor Maskiner Aktiebolag, Nacka, Sweden, a corporation of Sweden
Filed Mar. 16, 1965, Ser. No. 440,212
Claims priority, application Sweden, Mar. 20, 1964, 3,444/64
41 Claims. (Cl. 230—138)

The present invention relates to a screw compressor which comprises a casing provided with a working space comprising two intersecting cylindrical bores with parallel axes located between a low pressure and a high pressure end wall enclosing two cooperating rotors provided with helical lands and intervening grooves having a wrap angle of less than 360°, which rotors are sealingly surrounded by said bores. One rotor is of the male rotor type, i.e., shaped in such a way that its lands and grooves have at least their major portions located outside the pitch circle of the rotor and are provided with flanks the substantial portions of which are convex. The second rotor is of the female rotor type, i.e., shaped in such a way that its lands and grooves have at least their major portions located inside the pitch circle of the rotor and are provided with flanks the substantial portions of which are concave. The working space is provided with low pressure and high pressure ports the major portions of which are located on opposite sides of the plane of the axes of the bores and located at the low pressure and the high pressure ends, respectively, of the bores. The low pressure and high pressure ports are furthermore in communication with low pressure and high pressure channels, respectively, provided in the casing. Within the working space, compression chambers are formed and operate in a manner hereinafter to be described.

It is essential under many operating conditions to be able to adjust the capacity of a compressor, i.e., the mass of working fluid passing per unit of time through the compressor to its high pressure port. Such an adjustment can be obtained by throttling the flow through the inlet conduit to the compressor but in this way such large losses are obtained that it can only be used when the degree of adjustment and/or the time of adjustment is very unimportant. In another case the result is such a decrease of the efficiency obtained that the power necessary for the compressor will be disproportionately large.

Another method for adjustment is to vary the speed of the driving engine, which however is not always possible, for instance with an electric motor. Furthermore the degree of adjustment which can be obtained in this way is limited by the variation of the efficiency of the compressor and of the different torque characteristics, depending upon different speeds of the compressor and the motor, respectively.

The third method for adjustment is to admit working fluid without throttling to a compressor running at a constant speed and to provide a bleed port in the compressor adjustable by an axially slidable valve through which bleed port working fluid admitted to the compressor can be bled before compression thereof. Adjustment of this type, however, has up to now not been used in practice, partly owing to the difficulty of producing a design solving all the related problems, which will be described later on in this specification, and partly owing to the fact that it is not possible to obtain a sufficiently large adjustment by using normal principles of design.

One proposal for such a bleed adjustment is shown in U.S. Patent 2,358,815. According to the compressors shown in FIGS. 4–8 of this patent the bleed port is formed by a portion of a recess communicating with the high pressure channel which recess at the same time is used as a radial portion of the high pressure port. This recess and the barrel wall of the working space intersect along two straight edges parallel with the axes of the bore. The recess extends axially from the high pressure end wall to a fixed end edge which straight edges are located on both sides of the intersection line between the bores of the working space and on the same side of the plane of the axes of these bores on which the high pressure port is located. A valve is axially slidably mounted in this recess which valve is provided with straight edges which are in sealing proximity to the side portions of the recess and with one end parallel with the end edge of the recess. The surfaces of this slidable valve facing the working space are shaped as extensions of the barrel walls of the bores of the working space. The portion of the recess lying between the end edge and the slidable valve forms in this way a bleed port from the working space and the size of the bleed port can be adjusted by the slidable valve. The portion of the recess lying between the slidable valve and the high pressure end wall forms in this way a radial high pressure port the size of which will also be adjusted by the sliding valve. The distance from the low pressure end wall to the end edge of the recess is such that the rotor grooves following the crests passing this edge have not yet produced any appreciable decrease in volume by the entrance of a land of one rotor into a groove of the second rotor. The working fluid which is bled through the bleed port during the operation of the compressor has thus not been subjected to any compression with resultant loss of power.

Compressors of this type have weaknesses due to the fact that the inbuilt pressure ratio of the compressor will decrease rapidly with adjustment towards decreasing capacity which has a disadvantageous influence on the efficiency and due to the fact that the slidable valve will produce a leakage from the high pressure port to the bleed port, which also has a disadvantageous influence on the efficiency. Furthermore there are difficulties in adjusting the slidable valve so that it always seals against the rotors independently of its axial position and without coming in direct contact with the rotors in any position. There are further difficulties in adjusting the sliding valve during rotation of the rotors due to the considerable axial forces acting on the slidable valve and due to the friction between the slidable valve and the casing. For this reason it has not been possible to produce a compressor which has been adjustable during operation.

The present invention relates to a screw compressor provided with a bleed port and a slidable valve of the type mentioned above for adjustment thereof and provided with new designs of the high pressure port of the compressor and of the slidable valve. These new designs make it possible in part to adjust the compressor down to very low capacities in relation to the maximum one, i.e., down to a capacity below 50%, and particularly down to a capacity of about 10% and even below, with an efficiency which up to now it has not been possible to reach, and in part to make the adjustment of the slidable valve much more easy, so that it can be adjusted during operation with safety and accuracy while at the same time the leakage along the slidable valve from the high pressure port to the bleed port is practically eliminated.

The invention will be described more in detail in the following part of this specification, in connection with some embodiments of compressors shown in the accompanying drawings.

Figure 2:
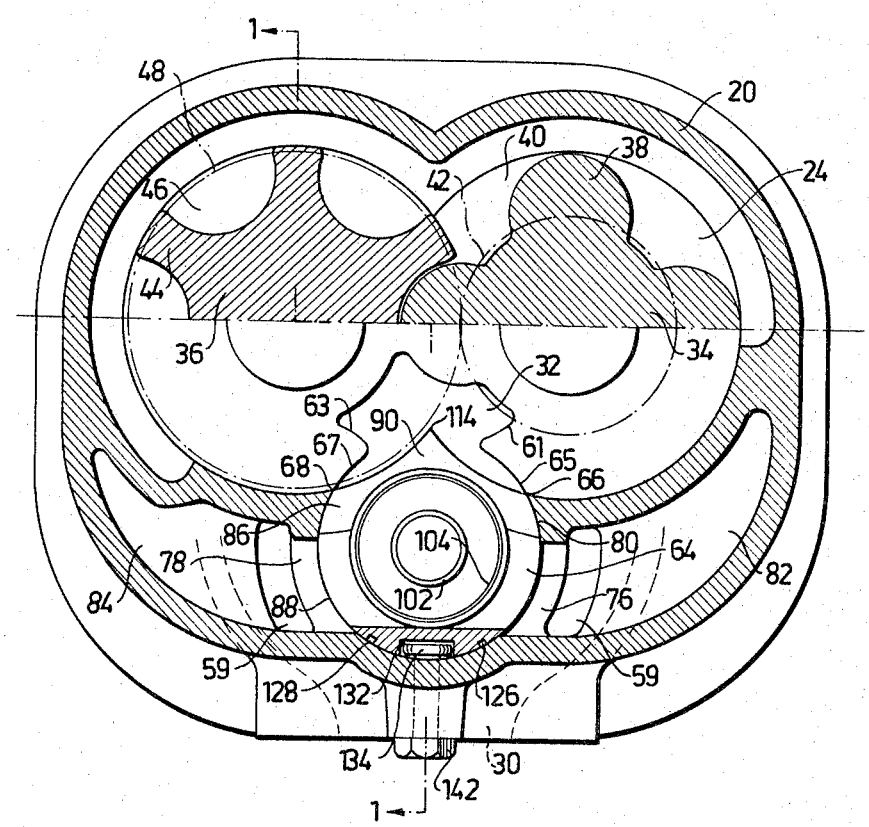
Figure 3:
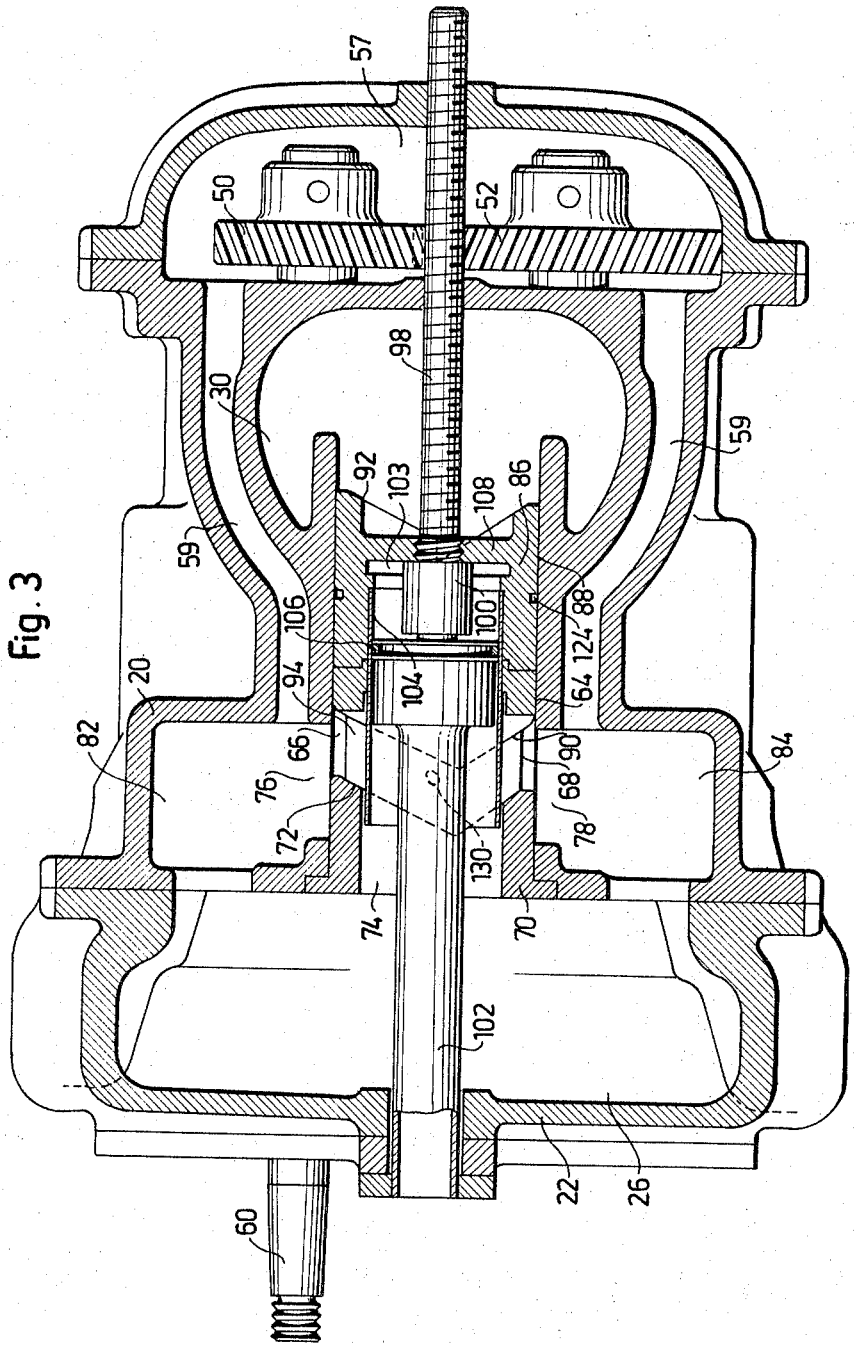
Figure 4:
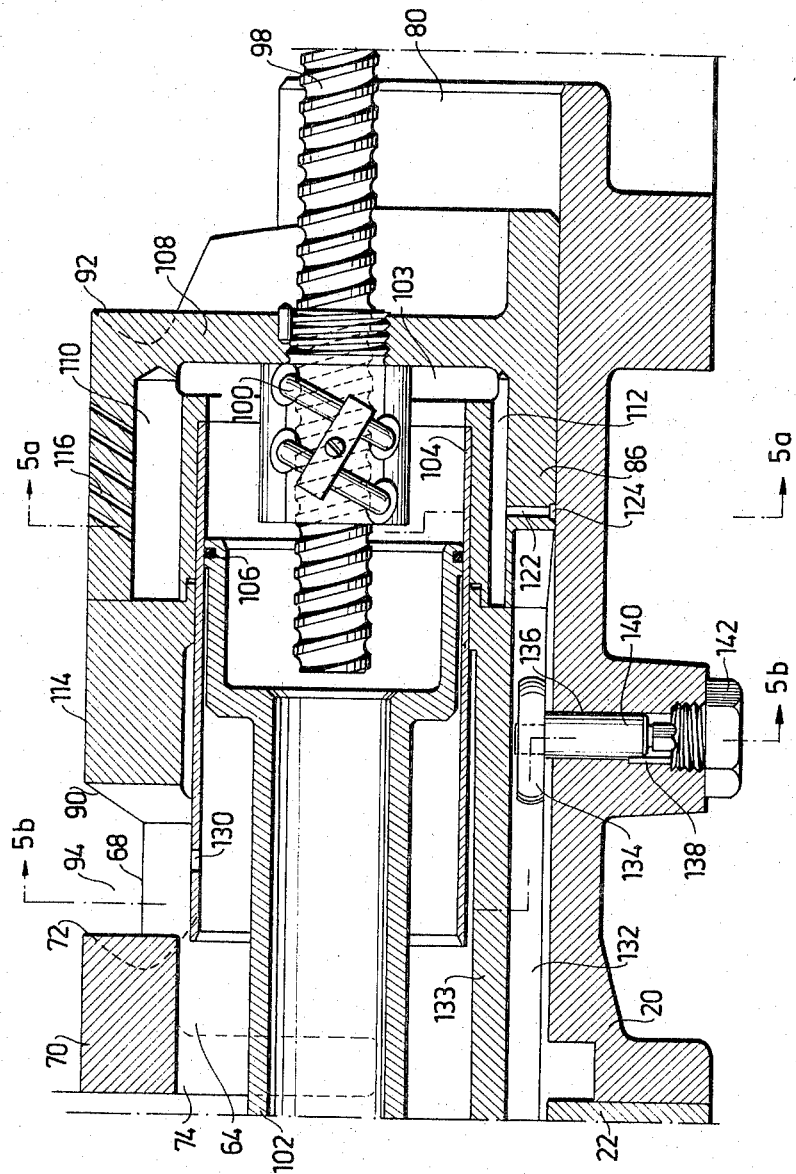
Figure 5:
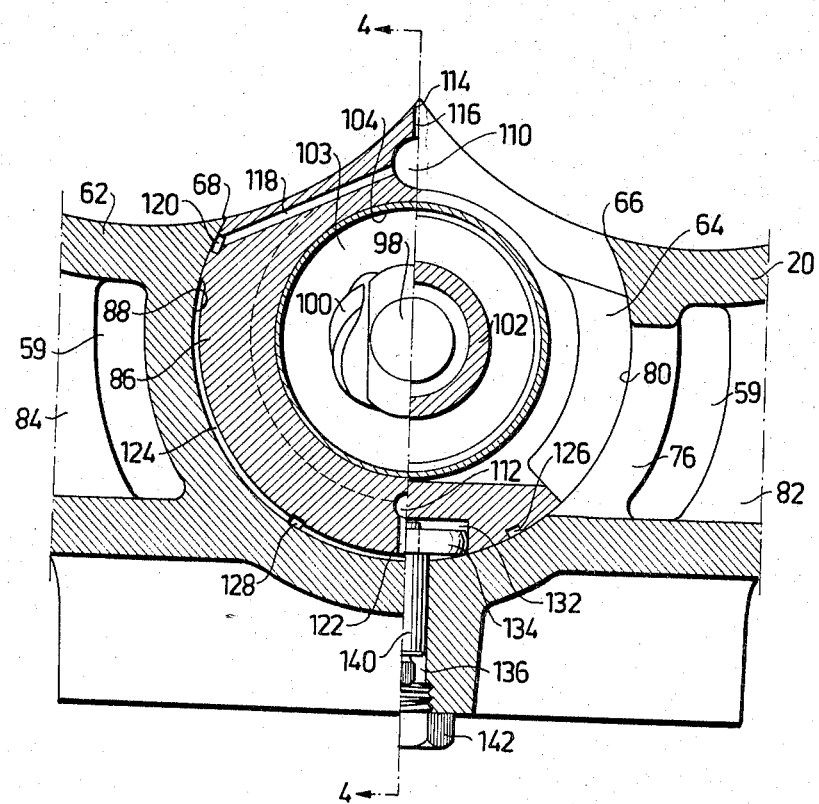
Figure 6:
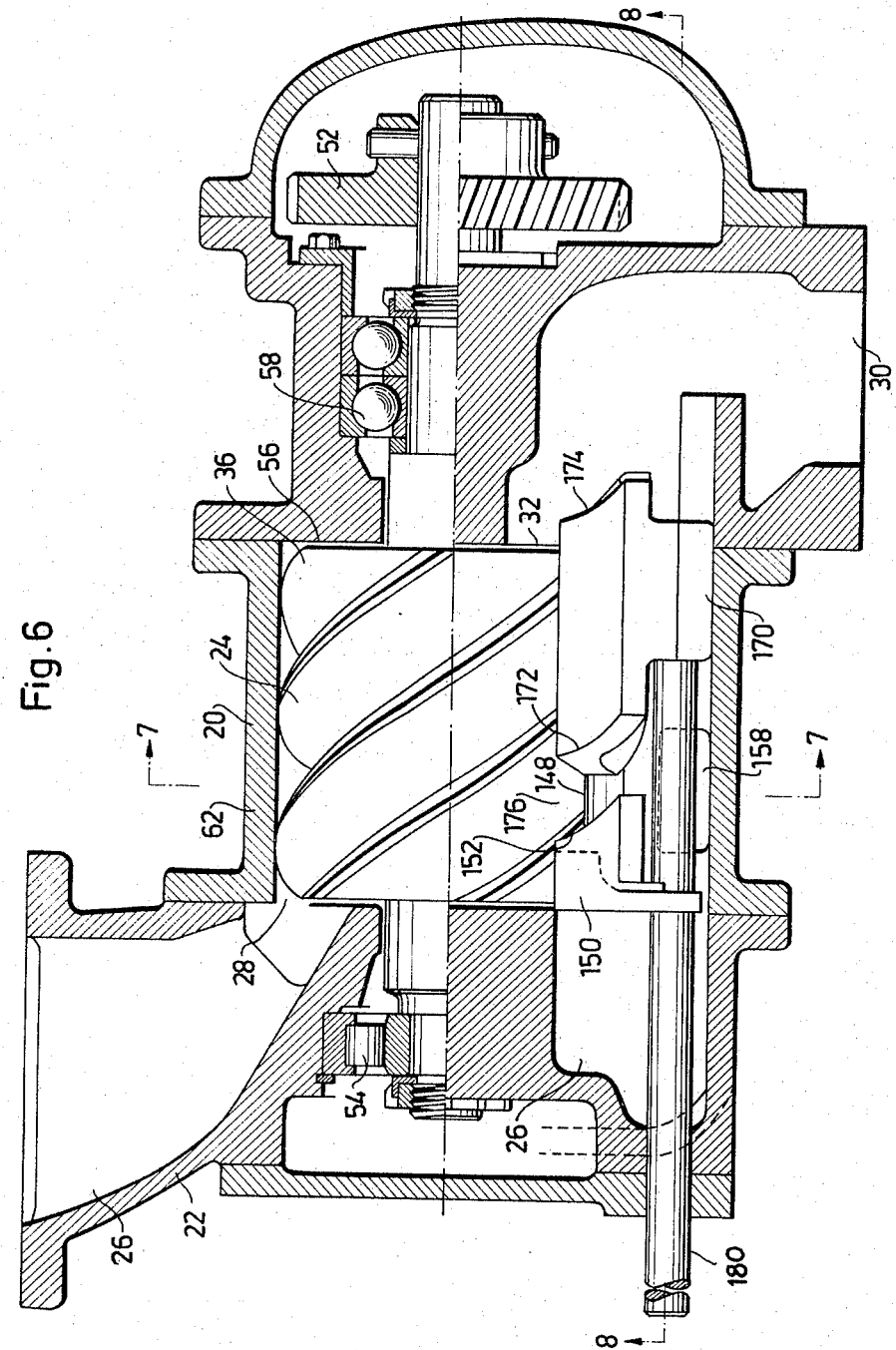
Figure 7:
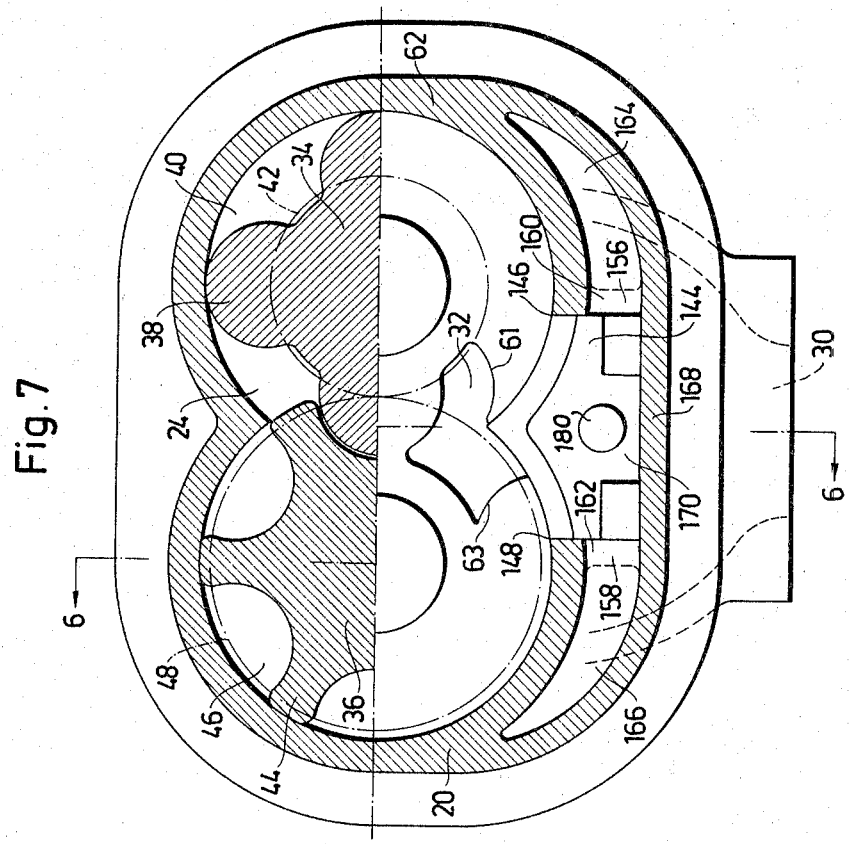
Figure 8:
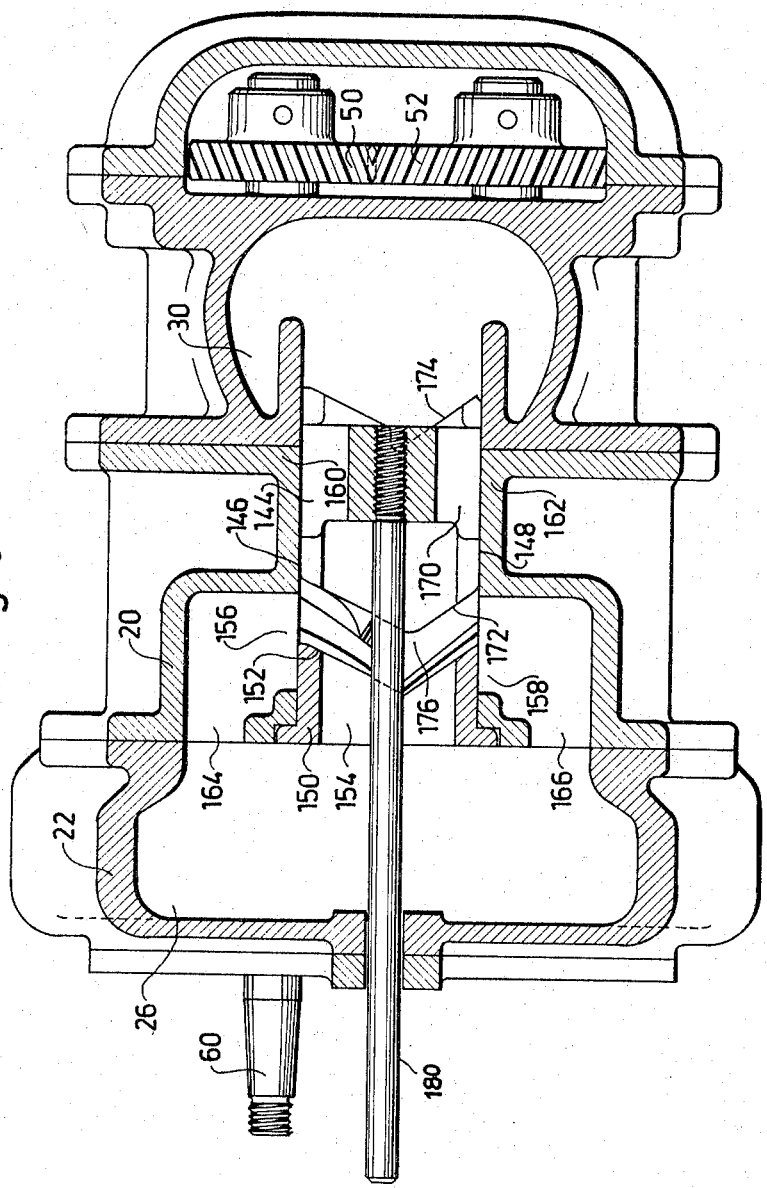
Figure 9:
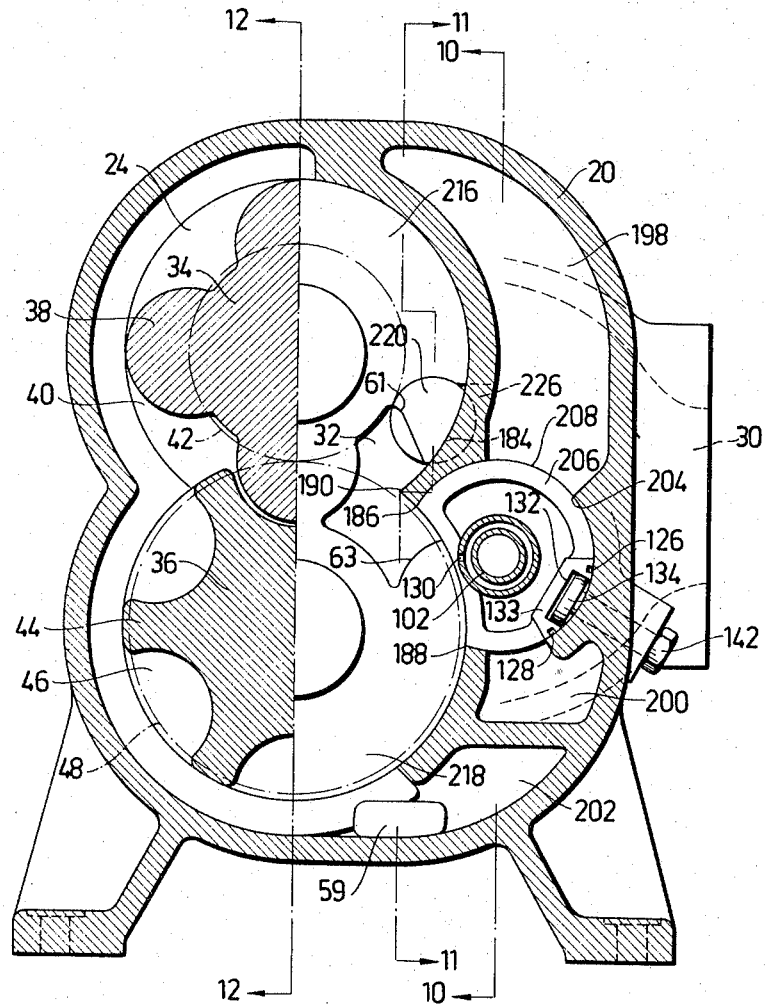
Figure 10:
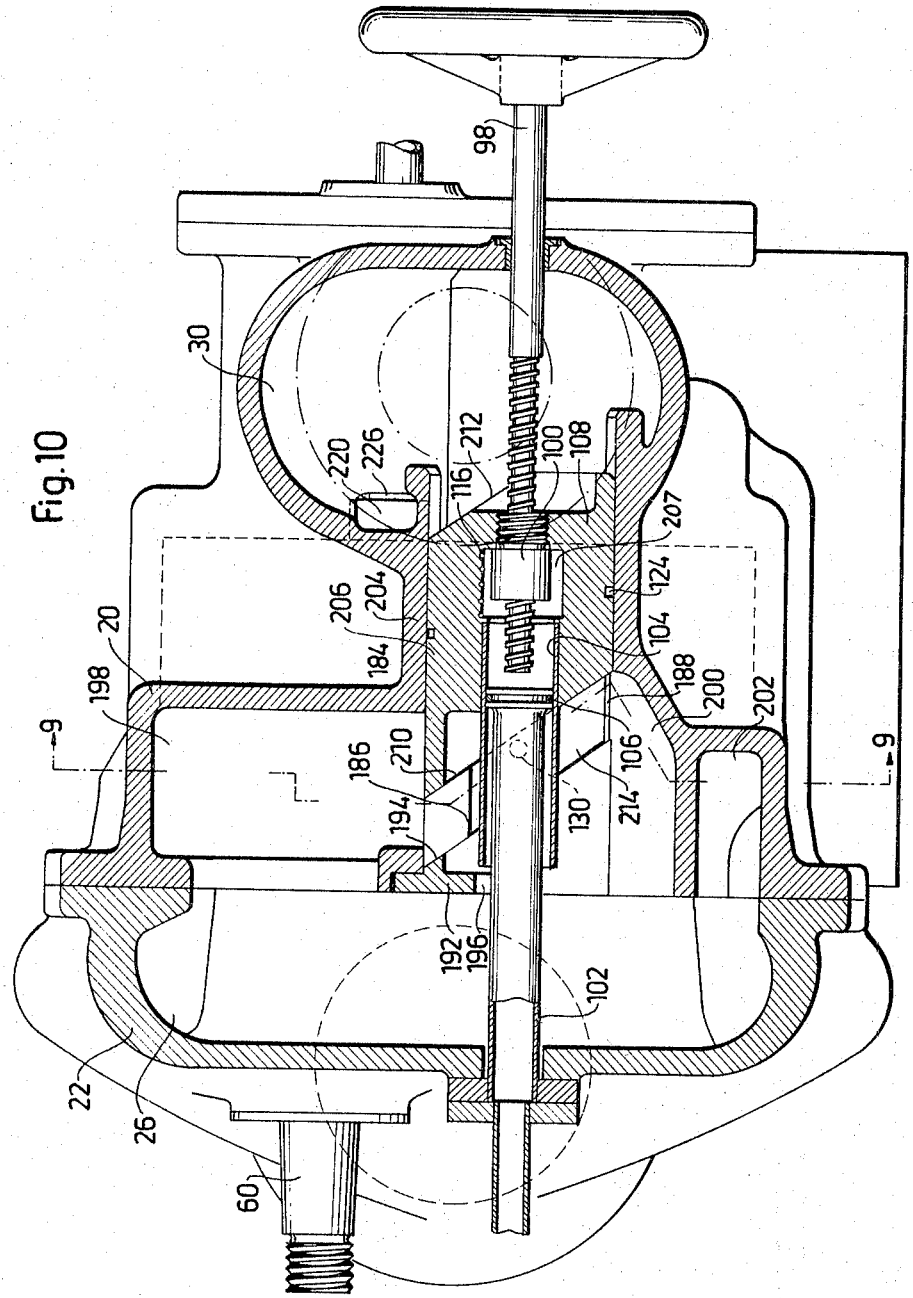
Figure 11:
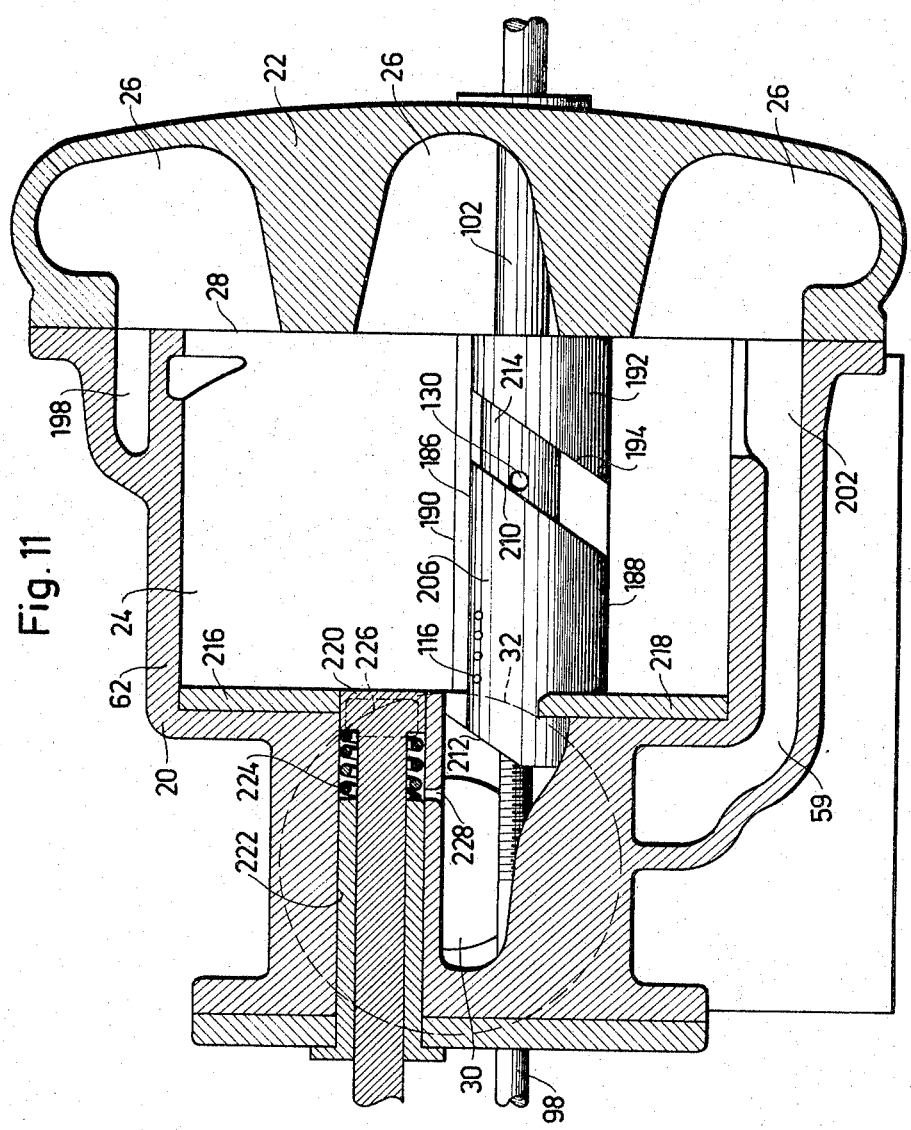
Figure 12:
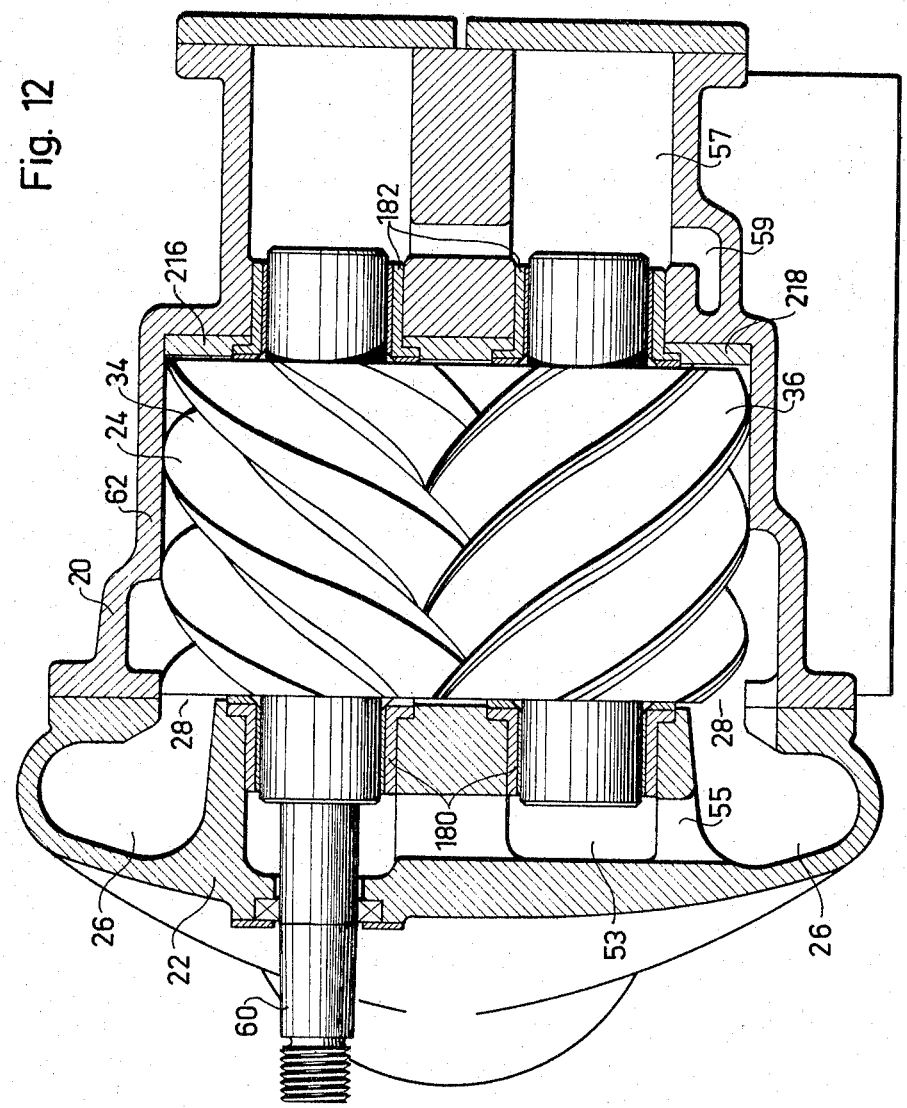
Figure 13:
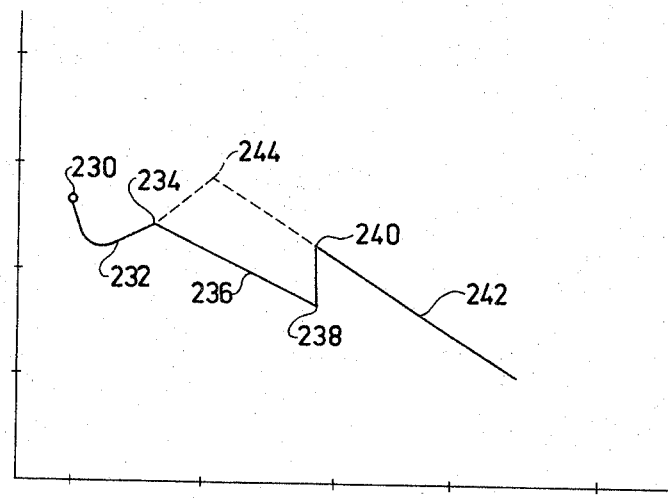

FIG. 1 shows a longitudinal section through a first compressor taken along line 1—1 in FIG. 2, FIG. 2 shows a transverse section along line 2—2 in FIG. 1 with the rotors partially broken away, FIG. 3 shows a longitudinal section taken along line 3—3 in FIG. 1, FIG. 4 shows a detail of FIG. 1 on a larger scale, FIG. 5 shows a transverse composite section taken partly along the line 5a—5a (left half) and partly along line 5b—5b (right half) in FIG. 4, FIG. 6 shows a longitudinal section through another compressor taken along the line 6—6 in FIG. 7, FIG. 7 shows a transverse section taken along the line 7—7 in FIG. 6 with the rotors partially broken away, FIG. 8 shows a longitudinal section taken along the line 8—8 in FIG. 6, FIG. 9 shows a transverse section of a third compressor taken along the line 9—9 in FIG. 10, with the rotors partially broken away, FIG. 10 shows a longitudinal section taken along the line 10—10 in FIG. 9, FIG. 11 shows a longitudinal section taken along the line 11—11 in FIG. 9, FIG. 12 shows a longitudinal section taken along the line 12—12 in FIG. 9, and FIG. 13 shows in a diagram the inbuilt volume ratio as a function of the position of the slidable valve.

The screw compressor shown in FIGS. 1–5 comprises a casing 20 provided with a low pressure end plate 22 in which casing the working space 24 is provided substantially in the form of two intersecting cylindrical bores of the same size having parallel axes located in the same horizontal plane. In the low pressure end plate 22 a low pressure channel 26 is provided which communicates with the working space 24 through a low pressure port 28 located in the contact plane between the low pressure end plate 22 and the casing 20. Furthermore a high pressure channel 30 is provided in the casing 20 which high pressure channel communicates with the working space 24 through an axial high pressure port 32. Two cooperating rotors, one male rotor 34 and one female rotor 36, are provided in the working space 24 with their axes coaxial with the axes of the bores. The male rotor 34 is provided with four helical lands 38 with intervening grooves 40 which have a wrap angle of about 300°. The lands 38 have flanks the major portions of which are convex and located outside the pitch circle 42 of the male rotor and have a radial extent outside the pitch circle of about 18% of the outer diameter of the rotor 34. The female rotor 36 is provided with six helical lands 44 with intervening grooves 46 which have a wrap angle of about 200°. The grooves 46 have a cross-section substantially in the form of a segment of a circle and are provided with flanks the major portions of which are concave and located inside the pitch circle 48 of the female rotor.

The rotors 34, 36 are connected by synchronizing gears 50, 52 and are mounted in the low pressure end wall 22 by cylindrical roller bearings 54 located in a bearing chamber 53 and in the casing 20 at the high pressure end wall 56 thereof by twin ball thrust bearings with shoulders 58 located in a bearing chamber 57. The male rotor 34 is further provided with a stub shaft 60 (FIG. 3) extending outside the low pressure end plate 22 for connection to a driving engine not shown.

Most of the low pressure port 28 extends on one side of the plane of the axes of the bores and the axial high pressure port 32 is completely located on the other side of said plane.

The casing 20 is provided with a recess 64 communicating with the axial high pressure port 32 which recess extends axially from the high pressure end wall 56 towards the low pressure end plate 22. The recess 64 and the barrel wall of the working space 24 intersect along two straight edges 66, 68 parallel with the axes of the bores. The recess 64 has a cross-section in the form of a segment of a circle and the intersection edges 66, 68 lie symmetrically around the intersection line between the bores and at a distance in relation to each other which amounts to about 75% of the distance between centres of the bores. The circular barrel wall 80 of the recess 64 extends past the high pressure end wall 56 into the high pressure channel and a turned cavity corresponding to the circular surfaces of the recess is made in the high pressure end wall 56 in view of the manufacturing possibilities so that the axial high pressure port 32 adjacent to the working space 24 has edges 65, 67 which follow circular arcs around the centre of the recess 64.

The edges defining the portion of the axial high pressure port 32 facing the line connecting the centres of the bores substantially follow curves coinciding with the bottom circles of the rotors with an intermediate portion substantially following the trailing flank of a male rotor land in a position where the land is in maximum mesh with a female rotor groove from a point at the male rotor which point is defined as the intersection point between the bottom circle of the male rotor and a radius from the centre of the male rotor, forming an angle of about 60° with the line connecting the male rotor centre with the female rotor centre to a point at the female rotor located in a corresponding place with relation to the rotation of the rotors. From these points at the bottom circles the edges 61, 63 of the axial high pressure port 32 follow curves which substantially correspond to the lines of the trailing flanks of the cooperating rotor lands 38, 44 radially outwardly to the points where the edges 61, 63 and the edges 65, 67 defined above intersect. The axial high pressure port 32 is thus completely located within an area extending between two limiting planes symmetrically located relatively to the plane of the lines of intersection between the bores each of which limiting planes includes one of said straight edges 66, 68 and the axis of the respective bores.

A separable portion 70 of the casing which portion, is in sealing contact with the recess and has a cross-section corresponding to that of the working space 24 is located in the recess 64 at the low pressure end plate 22 and fixed to the main body of the casing 20. This casing portion 70 is provided with an edge 72 substantially parallel with the crests of the cooperating rotor lands 38, 44 which edge defines the end of the recess 64 and is located at such a distance from the low pressure end plate 22 that the volume of the grooves 40, 46 of the rotors has not yet appreciably decreased by the entrance of the trailing lands 38, 44 into the grooves 40, 46 when the preceding lands 38, 44 pass the edge 72.

The recess 64 communicates with the low pressure channel 26 through an axial channel 74 in the casing portion 70 and through ports 76, 78 in the barrel wall 80 of the recess 64 and channels 82, 84 in the casing 20.

An axially slidable valve 86 is further located in the recess 64, which valve is provided with a cylindrical wall 88 sealingly cooperating with the barrel wall 80 of the recess 64 and with a cross-section corresponding to that of the bores of the working space 24 at that end of the valve extending outside the recess 64, which extending portion of the valve has its outermost point 114 lying at a radial distance from the axis of the cylindrical wall 88 of the valve 86 which distance is smaller than the radius of said cylindrical wall. The valve 86 is further provided with an edge 90 at the end thereof facing the low pressure end plate 22 which edge is parallel with the edge 72 of the casing portion 70. The slidable valve 86 is provided with an end edge at the opposite end 92 thereof facing the high pressure end wall 56 of the working space, which edge is substantially parallel with the crests of the cooperating rotor lands 38, 44.

The space between the end edge 72 of the casing portion 70 and the end edge 90 of the valve 86 forms in this way a bleed port 94 communicating with the low pressure channel 26 while the portion of the recess 64 located between the high pressure end wall 56 of the working space and the end 92 of the valve 86 facing that wall forms a radial high pressure port communicating with the high pressure channel 30.

An adjustment screw 98 is angularly adjustably mounted and axially fixed in the casing 20. This adjustment screw 98 is located coaxially with the axis of the barrel wall 88 of the valve 86 and cooperates with a nut 100 of ball bushing type fixed in the valve 86 for sliding motion of the valve 86 between two end positions. In one of these end positions the edge 90 of the valve 86 sealingly rests against the edge 72 of the casing portion 70 so that the bleed port 94 is completely closed and the radial high pressure port has its maximum size. In this way the compressor is adjusted to the position for maximum capacity. In the second end position the edge 90 of the valve 86 is located substantially above the middle of the bottom of the rotor grooves 40, 46 in the cooperating rotors 34, 36 when these grooves open towards the axial high pressure port 32. In this way the compressor is adjusted to the position for minimum capacity which is practically zero but with on the whole unchanged pressures in the high pressure channel 30 and in the low pressure channel 26. By motion of the valve 86 from the first end position in a direction towards the second one the size of the bleed port 94 increases continuously while the size of the radial high pressure port first decreases continuously down to zero and thereafter is held completely closed. Motion of the valve 86 in the opposite direction cause the opposite to occur.

A pipe 102 is fixed in the low pressure end plate 22 which pipe is coaxial with the axis of the barrel wall 80 of the slidable valve and extends through the axial channel 74 into a chamber 103 (FIG. 3) in the valve 86. The pipe 102 communicates with a pressure liquid source preferably for lubricating oil, not shown. The pipe 102 has a diameter at the end thereof extending into the chamber 103 of the valve 86 which diameter is enough to encircle the nut 100 (FIG. 4) without any appreciable throttling. The end of the pipe 102 extending into the valve 86 is further provided to sealingly cooperate at its outer periphery with a circular wall portion 104 of the chamber 103. The pipe 102 is also provided with a seal 106 of O-ring type contacting the wall portion 104. In this way the pressure liquid supply to the chamber 103 of the valve 86 is guaranteed in all positions of the valve 86. The valve 86 is further provided with an end wall 108 closing the chamber 103 and located at the end 92 thereof facing the high pressure end wall 56 of the working space.

Close to the end wall 108 the chamber 103 is enlarged so that it communicates with two bores 110, 112 (FIG. 4) in the valve 86 which bores are parallel with the wall portion 104. The bores 110, 112 have their axes located in a plane through the axis of the wall portion 104 and through the edge 114 formed between the bores of the working space. The bore 110 is located between the wall portion 104 and said edge 114 while the bore 112 is located on the opposite side of the wall portion 104. A number of axially spaced bores 116 between the bore 110 and said edge 114 are further provided in the valve 86. These bores 116 form an angle with the plane through the axes of the rotors 34, 36 and act as injection openings for liquid to the working space 24. The bore 110 communicates further through two bores 118 with two axial grooves 120 in the barrel wall 88 of the valve 86 which grooves are located adjacent to the working space so that liquid is supplied to the barrel wall 88 of the valve 86 for lubrication thereof, for preventing leakage peripherally around the valve 86 and for counteracting any tilting of the valve 86. The bore 112 communicates through a radial bore 122 with a circumferential groove 124 in the barrel wall 88 of the valve 86 which circumferential groove extends circumferentially around the valve from the adjacency of one of the axial grooves 120 to the adjacency of the second axial groove. This circumferential groove 124 is so located on the valve 86 that when the valve is in its second end position corresponding to maximum size of the bleed port 94 the groove 124 is in sealing contact with the extension of the barrel wall 80 of the recess 64 extending out into the high pressure channel 30. A groove 124 communicates further with two axially extending grooves 126, 128 in the barrel wall 88 of the valve 86 which grooves extend from the groove 124 in a direction towards the end of the valve 86 facing the low pressure end plate 22. By supplying liquid to these grooves 124, 126, 128 lubrication of the barrel wall 88 of the valve 86, sealing against leakage along the valve 86 by means of the groove 124, and balancing of the gas forces acting in radial direction upon the valve 86 by means of the grooves 126, 128 are all obtained. An opening 130 is further provided in the wall portion 104 of the valve 86, which opening is located outside the end facing the casing portion 70 and directed towards the working space 24. When the valve 86 is in such a position that this opening 130 has passed the end of the pipe 102 extending into the valve 86 which is the case when the valve 86 is moved to its second end position so that the bleed port 94 has its maximum size and the main portion of the liquid injected through the bores 116 is injected directly into the high pressure channel 30, liquid is injected through the opening 130 into the working space for supply of liquid to the surfaces of the rotors 34, 36.

A guiding groove 132 is provided in the valve 86 between the axially extending grooves 126, 128, which guiding groove extends from the adjacency of the circumferential groove 124 out into a portion 133 of the valve 86 extending towards the low pressure channel 26 at the end of which it communicates with the low pressure channel 26. This guiding groove 132 cooperates with a guiding body 134 fixed in the casing 20, which guiding body is eccentrically mounted on a dowel 140 which is angularly adjustable in a hole 136 in the casing 20 and anchorable by a pin 138. Before anchoring of the dowel 140 by the pin 138 the dowel is angularly adjusted so that the valve 86 by the eccentrically mounted guiding body 134 is angularly adjusted to a position where the edge 114 of the valve 86 is on the same line as the corresponding edge of the casing portion 70 so that it is guaranteed that the rotors 34, 36 during their rotation will not come into contact with the valve 86. When this position has been adjusted a hole is made partly in the casing 20 partly in the dowel 140 in which hole the pin 138 is inserted. The hole 136 is then closed by a screw 142.

The bearing chamber 53 communicates directly through a channel 55 with the low pressure channel 26 and the bearing chamber 57 communicates through a channel 59 and the recess 64 with the low pressure channel 26.

The compressor according to the invention acts in the following way. At start the valve 86 is first moved to its second end position in which the bleed port 94 has its maximum size so that the compression work is decreased to a minimum. In this position of the valve liquid is injected through the opening 130 into the working space 24. The motor is then started and runs up to its normal working speed. The valve 86 is then moved to its first end position in which the bleed port 94 is closed and the radial high pressure port has its maximum size. Working fluid flows then through the low pressure channel 26 and the low pressure port 28 into the working space 24 where it is sucked into the grooves 40, 46 of the rotors 34, 36, which grooves are open towards the low pressure port 28. When the rotor grooves 40, 46 in this way have been filled with working fluid a land 38 of the male rotor 34 enters a groove 46 of the female rotor 36 and a land 44 of the female rotor 36 enters a groove 40 of the male rotor 34 and a chevron shaped compression chamber comprising a portion of a groove of the male rotor 34 and a portion of a groove of the female communicating therewith is formed which chamber is closed in relation to the low pressure port 28 as well as to the high pressure port. This chevron shaped chamber has its base end located in a stationary plane at the high pressure end wall of the working space while its apex end is located at the place of intermesh between the rotor lands 38, 44 and moves axially upon rotation of the rotors 34, 36 so that the volume of the chevron shaped chamber is continuously decreased. When the lands 38, 44 preceding the grooves 40, 46 forming the chevron shaped chamber pass the edges of the high pressure port the communication is opened between the chevron shaped chamber and the high pressure channel so that the working fluid is forced out into the high pressure channel 30.

If the mass of working fluid delivered to the high pressure channel 30 is too large the valve 86 is moved in the direction towards the high pressure end wall 56 so that the bleed port 94 is opened and a portion of the working fluid sucked into the rotor grooves 40, 46 is returned to the low pressure channel 26 through the bleed port 94 without any compression thereof. In this way the volume of the chevron shaped chamber at the moment it is closed from the low pressure channel 26 decreases immediately from the volume of the chevron shaped chamber lying behind the lands 38, 44 cooperating with the edge 72 of the casing portion 70 to the volume of the chevron shaped chamber lying in front of the lands 38, 44 cooperating with the edge of the valve 86. In practice however the decrease of the mass of the working fluid will due to throttling in the bleed port 94, not be so large as the corresponding volume decrease mentioned above. Owing to said immeditae decrease of the chevron shaped chamber when the compression starts while at the same time the volume of the chevron shaped chamber when it opens towards the high pressure port is practically unchanged the in-built volume ratio of the compressor will decrease which in-built volume compression ratio is the ratio between said volumes and thus also the in-built pressure ratio of the compressor will decrease so that a portion of the compression must be a full pressure compression during the phase during which the working fluid is forced out from the chevron shaped chamber. If the valve 86 is moved further in direction towards the high pressure end wall 56 the volume of the chevron shaped chamber when it is cut off from the low pressure channel 26 is further decreased but also at the same time the volume of the chevron shaped chamber when it is opened towards the high pressure channel 30 will be decreased with the same absolute value, which however, owing to the fact that the volume when the chamber is opened is less than that when it is closed, means that the in-built volume ratio and thus the in-built pressure ratio increases once more. If, however, the axial high pressure port 32 would not be smaller than that corresponding to the radial high pressure port defined by the straight edges 66, 68 of the recess 64 which has been pointed out as a characteristic feature of the compressor according to the invention, the volume of the chevron shaped chamber when it opens towards the high pressure channel 30 would not decrease and the in-built volume ratio and thus the in-built pressure ratio would decrease continuously. The volume of the chevron shaped chamber at the moment when it opens towards the high pressure channel 30 is thus for such a motion of the valve 86 completely dependent on the position of the edge of the valve 86 at its high pressure end 92 so that the in-built pressure ratio continuously increases with increased bleed. When the valve 86 has reached a certain position however the chevron shaped chamber will open towards the high pressure channel simultaneously through the axial high pressure port as well as through the radial high pressure port. The volume of the closed chevron shaped chamber has thus reached its minimum value and its volume when it opens towards the high pressure channel 30 will be constant upon further movement of the valve 86 while the volume of the chevron shaped chamber when it is cut off from the low pressure channel 26 continues to decrease upon further movement of the valve 86. The in-built volume ratio and thus the in-built pressure ratio will thus once more begin to decrease and continues to do so with further decrease of the capacity. The in-built pressure ratio at a certain capacity, however, will always be considerably larger than if the axial high pressure port 32 had had a size corresponding to that of the maximum radial high pressure port, so that the efficiency of the compressor at part loads will be considerably increased in relation to a compressor having an axial high pressure port of normal type. The factor determining the size of the axial high pressure port 32 is that the maximum in-built pressure ratio obtainable at part loads must be limited and preferably not exceed the in-built pressure ratio corresponding to maximum capacity. However, a compressor according to the invention permits obtaining an in-built pressure ratio that also at low part loads can be held so high than an acceptable efficiency will be obtained. The compressor can act down to an in-built pressure ratio of 1:1 which corresponds to a capacity of only 15–20% while with a compressor having an axial high pressure port of conventional type this pressure ratio would be obtained already at a capacity of about 50%. It has as a matter of fact in practice been shown that it is possible to drive the compressor also at lower pressure ratios than 1:1 without having any decrease of the efficiency.

In this way an adjustment down to zero capacity can be obtained which makes it possible to idle the compressor without dis-engagement of the driving motor and with acceptable idling losses.

By injection of liquid into the compressor direct cooling and increased sealing is obtained as is earlier known per se. In a compressor designed according to FIGS. 1–5 however also an effective sealing against leakage along the outer surfaces of the slidable valve 86 is obtained. Furthermore, a certain balancing of the axially directed forces acting on the valve 86 is obtained owning to the fact that the area of the pipe 102 at its mouth in the valve 86 is considerably larger than the cross-sectional area of the adjusting screw 98 which in connection with the balancing of the forces acting in radial direction of the valve 86 by means of the grooves 126, 128 and the lubrication obtained by supply of liquid to the barrel wall 88 of the valve 86, especially if it is a lubricating oil, means a considerable decrease of the forces which are necessary for motion of the valve 86. It has in this way been practically possible to move the valve 86 even with large pressure differences between the high pressure channel 30 and the low pressure channel 26.

During the operation of the compressor the bearing chambers 53, 57 are drained through channels 55, 59 to the low pressure channel 26 where also the oil flowing out through the bleed port 94 which oil does not immediately accompany the working fluid back into the working space is collected. When the level of the oil has raised so high in the low pressure channel 26 that the oil begins to enter the working space 24 it will be acted upon by the rotors and drawn into the working space so that the double purpose is obtained partly that oil is supplied to the working space 24, partly that the oil without any separate pump is transferred to the high pressure channel 30 where it, by an oil separator not shown, is separated from the working fluid and by a pump not shown and through a cooler also not shown with a relatively shall pressure increase is brought back to the chamber 103 of the slidable valve and to the bearings 54, 56, respectively.

The compressor shown in FIGS. 6–8 is built in about the same way as the compressor shown in FIGS. 1–5 and the corresponding details have obtained the same reference numbers. The differences relate only to the shape of the recess in the barrel wall of the working space, to the casing portion 70 located therein and to the slidable valve and its adjustable means.

The casing 20 is provided with a recess 144 communicating with the axial high pressure port 32 which recess extends axially from the high pressure end wall 56 towards the low pressure end plate 22. The recess 144 and the barrel wall of the working space 24 intersect along two straight edges 146, 148 parallel with the axes of the bores. The recess 144 has a cross-section in the form of two contiguous rectangles. The distance between these straight edges 146, 148 is so large that no part of the axial high pressure port 32 extends outside the radii drawn from the centres of the bores forming the working space to these edges. A casing portion 150 which is in sealing contact with the recess and has a cross-section corresponding to that of the working space 24 is located in a recess 144 at the low pressure end plate 22. The casing portion 150 is provided with an edge 152 which limits the size of the recess 144 and which is located at such a distance from the low pressure end plate 22 that the volume of the grooves 40, 46 of the rotors has not yet been appreciably decreased by the entry of the following lands 38, 44 into the grooves 40, 46 when the preceding lands 38, 44 pass the edge 152. The recess 144 further communicates with the low pressure channel 26 through an axial channel 154 in the casing portion 150 and through ports 156, 158 in the side walls 160, 162 of the recess 144 and channels 164, 166 in the casing 20. The bottom 168 and the side walls 160, 162 of the recess 144 extend into the high pressure channel 30 on the other side of the high pressure end wall 56 of the working space.

An axially slidable valve 170 is further provided in the recess 144, which valve has a cross-section corresponding to the cross-sections of the working space 24 and of the recess 144 and which valve sealingly cooperates with the side walls 160, 162 and the bottom 168 of the recess. The valve 170 is further provided with an edge 172 at the end thereof facing the low pressure end plate 22, which edge is parallel with the edge 152 of the casing portion 150. The valve 170 at its opposite end 174 faces the high pressure end wall 56 of the working space provided with an edge which is substantially parallel with the cooperating crests of the rotor lands 38, 44.

The space between the edge 152 of the casing portion 150 and the edge 172 of the valve 170 forms in this way a bleed port 176 communicating with the low pressure channel 26, while the portion of the recess 144 lying between the high pressure end wall 56 of the working space and the end 174 of the valve 170 facing this end wall forms a radial high pressure port communicating with the high pressure channel 30. An adjusting rod 180 is fixed to the valve 170 which rod extends through the axial channel 154 and the low pressure end plate 22 and is adjustable in axial direction by operating means not shown. Movement of the slidable valve 170 in the direction towards the high pressure end wall 56 of the working space decreases the size of the radial high pressure port at the same time as the size of the bleed port 176 is increased, and vice versa.

The compressor of the type shown in FIGS. 6–8 acts in principle in the same way as a compressor according to FIGS. 1–5 with the difference that no liquid is supplied for cooling and sealing in the working spade and for balancing, sealing and lubrication of the valve 170. The non-existing axial balancing of the valve is then compensated for by a modified cross-section of the valve and of the recess 144 so that the area of the valve exposed to axial forces is reduced. The compressor shown in FIGS. 9–12 is designed substantially in the same way as the compressor shown in FIGS. 1–5 and corresponding details have been given the same reference numbers. The differences relate only to the design of the mounting of the rotors, and to the recess in the barrel wall of the working space, to the separable casing portion mounted therein, to the slidable valve and to the channels provided in the casing. In addition to that, the plane of the axes of the bores of the working space is vertical and a further adjusting valve has been inserted in the high pressure end wall of the working space and also the synchronizing gears have been deleted.

The rotors 34, 36 are adapted for cooperation by direct contact between the flanks and are mounted in the low pressure end plate 22 and in the casing 20 at its high pressure end wall 56 by means of journal bearings 180 and 182, respectively, which journal bearings have bushings for absorption of radial forces and discs facing the end of the rotor for absorption of axial forces.

The casing 20 is provided with a recess 184 communicating with the axial high pressure port 32, which recess extends axially from the high pressure end wall 56 towards the low pressure end plate 22. The recess 184 and the portion of the barrel wall of the working space 24 cooperating with the female rotor intersect along two straight edges 186, 188 parallel with the axes of the bores. The recess 184 has a cross-section in the form of a segment of a circle. The straight edges 186, 188 lie at a distance in relation to each other which in a direction parallel with the line connecting the centres of the rotors 34, 36 has an extent of about 50% of the distance between said rotor centres. The distance from the intersection lines 190 between the bores of the working space to the edge 188 of the recess lying at the greatest distance from the intersection line is so great that no part of the axial high pressure port 32 extends outside the radius from the centre of the female rotor bore to this edge 188 and the radius from the centre of the male rotor bore lying symmetrically on the other side of the plane of the lines of intersection between the bores of the working space. A casing portion 192 which is in sealing contact with the recess and has a cross-section corresponding to that of the working space 24 is located in the recess 184 at the low pressure end plate 22. This casing portion 192 is provided with an edge 194 which limits the size of the recess 184 and which is located at such a distance from the low pressure end plate 22 that the volume of the female rotor groove 46 has not yet been appreciably decreased in volume by the entry of the following male rotor land 38 into the groove 46 when the preceding land 44 passes the edge 194. The recess 184 further communicates with the low pressure channel 26 through an axial channel 196 in the casing portion 192 and through channels 198, 200 in the casing 20. The low pressure channel 26 is further in direct communication with the working space 24 through a channel 202 in the casing 20 located at the vertically lowest point of the working space. The barrel wall 204 of the recess is further extended to the high pressure channel 26 on the other side of the high pressure end wall 56 of the working space.

An axially slidable valve 206 is further provided in the recess 184 which valve has a cross-section corresponding to that of the working space 24 and the circular barrel wall 208 which sealingly cooperates with the barrel wall 204 of the recess. The valve 206 is further provided with an edge 210 at the end of the valve facing the low pressure end plate 22 which edge is parallel with the edge 194 of the casing portion 192. The valve is further provided with an edge at the opposite end 212 thereof facing the high pressure end wall 56 which edge is substantially parallel with the cooperating crests of the female rotor lands 44.

The space between the edge 194 of the casing portion 192 and the edge 210 of the valve 206 forms in this way a bleed port 214 communicating with the low pressure channel 26, while the portion of the recess lying between the high pressure end wall 56 of the working space and the end 212 of the valve 206 facing the high pressure end wall forms a radial high pressure port communicating with the high pressure channel 30. The valve 206 is moved in the recess 184 by means of an adjusting screw 98 and a nut 100 in the same way as that described for the valve 86 in FIGS. 1–5.

Pressure liquid is supplied to a chamber 207 in the valve 206 in the same manner as has been described with relation to the chamber 103 in the valve 86 in FIGS. 1–5 and the pressure liquid is distributed therefrom to the outside of the valve 206 in a corresponding way. The only difference is that the two axial bores 110, 112 have been deleted. The openings 116 for injection of liquid into the working space 24 extend directly from the chamber 207 and mouth near the straight edge 186 of the recess.

The high pressure end wall 56 of the working space 24 comprises in this embodiment two discs 216, 218 fixed in the casing 20 in which discs the axial high pressure port 32 has been cut out in such a way that the edges 61, 63 thereof extend all the way out to the barrel wall 62 of the working space. Such an arrangement is of course possible to use also in the embodiment shown in FIGS. 1–5.

An axially slidable lifting valve 220 is provided in the axial high pressure port 32 in order to make it possible to adjust the size of this axial port. The lifting valve 220 is mounted in an axial bore 222 in the casing 20 extending outside the working space 24. The lifting valve 220 is held by a spring 224 in a position in which it seals the high pressure end wall 56 and it can (by means not shown) be drawn away from this position in order to increase the area of the axial high pressure port 32. The bore 222 communicates directly through a port 226 in the wall thereof with the high pressure channel 30 for flow of working fluid into the channel. In order to avoid compression of working fluid trapped behind the lifting valve 220 upon movement of the valve, the bore 222 further provides communication with the high pressure channel 30 through a hole 228. Of course a valve of corresponding shape can also be used at the female rotor side of the high pressure port.

A compressor according to FIGS. 9–12 acts in principle in the same way as a compressor shown in FIGS. 1–5. However, a compressor according to FIGS. 9–12 has some special characteristics which are that the liquid collected in the low pressure channel is conducted to the lowest point of the working space 24 through the channel 202 from which point the liquid is fed into the compressor by the female rotor 36 for conveyance to the high pressure port and to a liquid separator located behind the high pressure channel 30, from which liquid separator the liquid is returned to the valve 206 by a pump not shown. In this way it is insured that the slidable valve 206 is completely surrounded by gaseous working fluid so that direct contact between the working fluid bled from the working space 24 through the bleed port 214 and the liquid collected in the low pressure channel is avoided and that the entire pump work is carried out by the female rotor 36 which has a lower peripheral speed than the male rotor 34, for which reason the pump work will be less than in the embodiment shown in FIGS. 1–5.

The function of the lifting valve 220 is clearly shown in the diagram in FIG. 13, which diagram shows the variation of the in-built volume ratio as a function of the position of the slidable valve 206. When the valve 206 is in its first end position where the bleed port 214 is closed and the liftable valve 220 is open, the inbuilt volume ratio is that which is shown by the point 230. When the valve 206 is moved from this first end position the in-built pressure ratio decreases as has been earlier described in connection with FIGS. 1–5 and increases then again along the curve 232 until that this curve reaches the point 234 at which the radial and axial high pressure ports coincide. For further motion of the valve 206 the inbuilt pressure ratio decreases once more along the curve 236 owing to the fact that the volume of the chevron shaped chamber is held constant when it opens towards the high pressure port 32. When the valve 206 has been moved so far that the curve 236 has reached the point 238 the liftable valve 220 is closed so that the volume of the chevron shaped chamber when it opens towards the high pressure port is decreased in one immediate step which results in an immediate increase of the inbuilt volume ratio up to the point 240. When the valve 206 is moved further the inbuilt volume ratio then decreases continuously along the curve 242. The lifting valve 220 thus means that a higher in-built volume ratio and thus a higher efficiency can be obtained at low capacities of the compressor. As can be seen from the diagram in FIG. 13, the two curves 232, 242 would follow the dotted extensions thereof and meet at the point 244 if the axial high pressure port 32 should be designed with a constant area corresponding to a closed lifting valve 220. This would mean, however, that at relatively high part loads the in-built volume ratio would be too large and thus the efficiency would be decreased at these capacities.

The invention is of course not restricted to the embodiments shown but a change of corresponding elements between those embodiments is quite possible and further modifications and supplements thereof are possible as long as they fall within the scope of the following claims.

I claim:

1. In screw compressor apparatus of the character described having a casing with a working space disposed therein in the shape of two intersecting cylindrical bores with parallel axes, a high pressure end wall at one end thereof, a low pressure end wall at the other end thereof, intermeshing male and female rotors disposed in said working space in sealing engagement with said casing and the end walls thereof and having helical lands and intervening grooves with a wrap angle of less than 360°, said male rotor having the major portion of its lands and grooves outside the pitch circle thereof and with its flanks substantially convex, and said female rotor having the major portion of its lands and grooves inside the pitch circle thereof and with its flanks substantially concave, a low pressure port adjacent said low pressure end wall, an axial high pressure port at the end of said working space opposite from said low pressure port and with said ports being located substantially on opposite sides of a plane through the axes of said bores, low pressure channels in said casing in flow communication with said low pressure port and high pressure channels in said casing in flow communication with said high pressure port, the combination which comprises an axially extending recess disposed in said casing and extending from said high pressure end wall to a fixed end edge of said recess and being in flow communication with said high pressure channels, said recess and the wall of said working space intersecting along two straight edges parallel with the axes of said bores and on the same side of said plane through the axes of said bores, with at least one of said straight edges being located in the casing wall portion of the bore surrounding said female rotor, a valve axially movably disposed in said recess and in sealing engagement therewith, said valve having a profile on the surface thereof facing said working space corresponding thereto, and with a low pressure control edge parallel with and facing the end edge of the said recess, and with a high pressure control edge facing the high pressure channels, the portion of said recess defined by said straight edges, by the end edge of said recess, and by said low pressure control edge forming a bleed port providing flow communication from said working space to the low pressure end of said casing with the portion of the recess defined by the said straight edges, the high pressure end wall and the high pressure control edge forming a radial high pressure port, said valve being adjustable between a first position in which the bleed port is closed, and a second position in which at least a portion of said high pressure control edge extends outside the high pressure end wall into said high pressure channel, and an axial high pressure port disposed in said high pressure end wall, said axial high pressure port being limited by two outer edge portions, each extending generally radially from the wall of one bore to the bottom circle of the grooves of the corresponding rotor, and by an intermediate edge portion, at least the major section of each of said outer edge portions being brought into register with the trailing flank of the trailing land of a rotor groove in communication with the high pressure channel after the trailing edge of the corresponding land tip has been in register with the axially outermost point of the high pressure control edge of said valve when the valve is in such a position that said axially outermost point is located in the plane of the high pressure end wall of said working space.

2. Screw compressor apparatus as described in claim 1 in which the second straight edge of the recess is located in the portion of the barrel wall surrounding the male rotor.

3. Screw compressor as defined in claim 2 in which both the straight edges of the recess lie at the same distance from the intersection line between the bores.

4. Apparatus as described in claim 1 in which said major sections of the outer edge portions of the said axial high pressure port are located within an area located between radial lines from the centers of the rotors to the trailing edge of the tip of the respective land, when the rotors are in the angular position corresponding to register in the plane of the high pressure end wall and with the axially outermost point of the high pressure control edge of the valve.

5. Apparatus as described in claim 1 in which the width of the said recess in a direction parallel with the connecting line between the centers of the bores is larger than 50% of the distance between the centers of said bores and smaller than 100% of said distance.

6. Screw compressor apparatus as described in claim 1 in which said end edge of the recess is located so that it coincides substantially with the radially outermost portion of the preceding flank of a groove of the respective rotor in the angular position thereof in which a land of the cooperating rotor starts to enter said groove.

7. Screw compressor as defined in claim 6 in which said end edge is substantially parallel with the edge of said groove flank.

8. Screw compressor apparatus as described in claim 1 in which said valve moves from one end position in which the edge of the valve defining the bleed port is sealingly engaged with the end edge of the recess to a second end position where said edge of the slidable valve is located approximately above the middle of a groove in the respective rotor when the preceding flank of said groove passes the edges of said axial high pressure port.

9. Screw compressor apparatus as described in claim 1 in which the angle between the line connecting the centres of the bores and a radius from the centre of the male rotor to every point of the edge of the axial high pressure port located at the bottom circle of the male rotor is less than 90°.

10. Screw compressor as defined in claim 9 in which said angle is less than 60°.

11. Screw compressor apparatus as described in claim 1 in which the edges of the axial high pressure port from the points located at the bottom circle of the respective rotor and circumferentially furthest away from the intersection line between the bores follow curves substantially corresponding to the line of the trailing flank of a land of the respective rotor.

12. Screw compressor as defined in claim 11 in which said edges of the axial high pressure port follow said curves out to the barrel wall of the bores.

13. Screw compressor apparatus as described in claim 1 in which the surfaces of said valve being in sealing adjacency to the casing are cylindrical at least adjacent to the working space.

14. Screw compressor apparatus as described in claim 1 in which said valve is shaped substantially as a circular cylinder and provided with recesses corresponding to the bores of the working space.

15. Screw compressor as defined in claim 14 in which the intersection line between said recesses of the valve lies at a radial distance from the centre of the cylinder being less than the radius of the barrel wall of the cylinder.

16. Screw compressor apparatus as described in claim 1 in which said valve is provided with an axial guiding groove cooperating with a stationary guiding body provided in the casing.

17. Screw compressor as defined in claim 16 in which said guiding groove of the valve is located at the side of the valve substantially diametrically opposite to that facing the working space.

18. Screw compressor as defined in claim 16 in which said guiding groove is open towards the end of the valve facing the low pressure end plate.

19. Screw compressor apparatus as described in claim 16 in which said guiding body is eccentrically mounted on a dowel angularly adjustable in the casing for adjustment of the position of the guiding body.

20. Screw compressor apparatus as described in claim 1 in which said valve is provided with a portion extending axially in the direction towards the low pressure end plate outside said edge parallel with the end edge of the recess.

21. Screw compressor apparatus as described in claim 1 in which the surfaces of the casing being in sealing adjacency to said valve extend into the high pressure channel.

22. Screw compressor apparatus as described in claim 21 in which the edges of the opening in the high pressure end wall of the casing providing the axial high pressure port in the area adjacent to the casing wall of the working space follow curves corresponding to extensions of the barrel walls of the recess.

23. Screw compressor as defined in claim 22 in which plates are located in the bores of the working space at the high pressure end wall thereof which plates define the shape and the size of the axial high pressure port.

24. Screw compressor apparatus as described in claim 1 having at least one further valve for adjustment of the size of the axial high pressure port.

25. In a screw compressor apparatus of the character described having a casing with a working space disposed therein in the shape of two intersecting cylindrical bores with parallel axes, a high pressure end wall at one end thereof, a low pressure end wall at the other end thereof, intermeshing male and female rotors disposed in said working space in sealing engagement with said casing and with the end walls thereof, and having helical lands and intervening grooves with a wrap angle of less than 360°, said male rotor having the major portion of its lands and grooves outside the pitch circle thereof and with its flanks substantially convex, and said female rotor having the major portion of its lands and grooves inside the pitch circle thereof and with its flanks substantially concave, a low pressure port adjacent said low pressure end wall, an axial high pressure port in said high pressure end wall, with said ports being located substantially on opposite sides of a plane through the axes of said bores, low pressure channels in said casing in flow communication with said low pressure port and high pressure channels in said casing in flow communication with said high pressure port, the combination which comprises an axially extending recess disposed in said casing and extending from said high pressure end wall to a fixed end edge of said recess and being in flow communication with said high pressure channels, said recess and the wall of said working space intersecting along two straight edges parallel with the axes of said bores and on the same side of said plane through the axes of said bores, with said straight edges being disposed in the bore wall surrounding said female rotor, a valve axially movably disposed in said recess and in sealing engagement with the walls thereof and having an end edge disposed in parallel relation to the end edge of said recess, said valve having a profile on the surface thereof facing said working space corresponding thereto, with the portion of said recess defined by said parallel straight edges and the end edge thereof and by the parallel end edge of said valve forming a bleed port providing flow communication from said working space to the low pressure end of said casing, and with that portion of said recess defined by said parallel straight edges, the high pressure end wall and the end of said valve facing said end wall defining a radial high pressure port providing flow communication radially from the high pressure end of said working space, and with said axial high pressure port being located completely within an area extending between two limiting planes symmetrically located relative to a plane through the lines of intersection between said bores, with at least one of said limiting planes including the one of said straight edges located at the greatest distance from said plane of symmetry and including the axis of the bore enclosing the female rotor.

26. Screw compressor apparatus as defined in claim 25 in which the width of the said recess in a direction parallel with the line connecting the centres of the bores is between about 30% and 70% of the distance between said centres.

27. In screw compressor apparatus of the character described having a casing with a working space disposed therein in the shape of two intersecting cylindrical bores with parallel axes, a high pressure end wall at one end thereof, a low pressure end wall at the other end thereof, intermeshing male and female rotors disposed in said working space in sealing engagement with said casing and the end walls thereof, and having helical lands and intervening grooves with a wrap angle of less than 360°, said male rotor having the major portion of its lands and grooves outside the pitch circle thereof and with its flanks substantially convex, and said female rotor having the major portion of its lands and grooves inside the pitch circle thereof and with its flanks substantially concave, a low pressure port adjacent said low pressure end wall, an axial high pressure port at the opposite end of said working space from said low pressure port with said ports being located substantially on opposite sides of a plane through the axes of said bores, low pressure channels in said casing in flow communication with said low pressure port and high pressure channels in said casing in flow communication with said high pressure port, the combination which comprises an axially extending recess disposed in said casing and extending from said high pressure end wall to a fixed end edge of said recess and being in flow communication with said high pressure channel, said recess and the wall of said working space intersecting along two straight edges parallel with the axes of said bores on the same side of said plane through the axes of said bores, with at least one of said straight edges being disposed in the bore wall surrounding said female rotor, a valve axially movably disposed in said recess and in sealing engagement therewith, said valve having a profile on the surface thereof facing said working space corresponding thereto and with a low pressure control edge parallel with and facing the end edge of said recess, and with a high pressure control edge facing the said high pressure channels, the portion of said recess defined by said straight edges, by the end edge of said recess, and by said low pressure control edge forming a bleed port providing flow communication from said working space to the low pressure end of said casing, with the portion of the recess defined by the straight edges, the high pressure end wall and the high pressure control edge forming a radial high pressure port, with a closed chamber disposed in said valve with an opening therein for the supply of a liquid under pressure which pressure is of at least the same magnitude as the pressure of the working fluid in the said high pressure port.

28. Screw compressor as defined in claim 27 in which said opening is provided in the end of the slidable valve facing the bleed port.

29. Screw compressor as defined in claim 27 in which at least one injection opening is provided in said valve which opening forms a channel from said closed chamber to the surfaces of the valve facing the working space.

30. Screw compressor as defined in claim 29 in which said injection openings are axially spaced along said valve.

31. Screw compressor as defined in claim 29 in which said injection openings open into the casing walls facing the working space within an area adjacent to and inclusive of the intersection line between the bores.

32. Screw compressor apparatus as described in claim 27 in which said valve is provided with openings forming flow communication from said closed chamber to the surfaces of the valve which are in sealing engagement with the walls of the casing.

33. Screw compressor as defined in claim 32 in which said communication openings are disposed in said valve in the surfaces thereof facing the walls of the casing adjacent to the working space and being in sealing engagement therewith.

34. Screw compressor as defined in claim 29 in which grooves located axially and circumferentially in the surfaces of said valve being in sealing adjacency of the walls of the casing are closed at their ends and are in communication with said communication openings.

35. Screw compressor apparatus as described in claim 33 in which an opening from the chamber of said valve is located axially outside the edge of the valve parallel with the end edge of the recess.

36. Screw compressor apparatus as described in claim 27 which includes chambers in the casing enclosing bearings for the rotors and which communicate with the working space through said channels.

37. Screw compressor apparatus as described in claim 36 in which the male rotor is provided vertically above the female rotor and said channels from the bearing chambers communicate with the working space at the lowest situated portion thereof.

38. In screw apparatus of the character described having a casing with a working space disposed therein in the shape of two intersecting cylindrical bores with parallel axes, a high pressure end wall at one end thereof, a low pressure end wall at the other end thereof, intermeshing male and female rotors disposed in said working space in sealing engagement with said casing and the end walls thereof and having helical lands and intervening grooves with a wrap angle of less than 360°, said male rotor having the major portion of its lands and grooves outside the pitch thereof and with its flanks substantially convex, and said female rotor having the major portion of its lands and grooves inside the pitch circle thereof and with its flanks substantially concave, a low pressure port adjacent said low pressure wall, an axial high pressure port in said high pressure end wall with said ports being located substantially on opposite sides of a plane through the axes of said bores, low pressure channels in said casing in flow communication with said low pressure port and high pressure channels in said casing in flow communication with said high pressure port, the combination which comprises an axially extending recess disposed in said casing and extending from said high pressure end wall to a fixed end edge of said recess and being in flow communication with said high pressure channels, said recess and the wall of said working space intersecting along two straight edges parallel with the axes of said bores and on the same side of said plane through the axes of said bores, with at least one of said straight edges being disposed in the bore wall surrounding said female rotor, a valve axially movably disposed in said recess and in sealing engagement with the walls thereof and having an end edge disposed in parallel relation to the end edge of said recess, said valve having a profile on the surface thereof facing said working space corresponding thereto with the portion of said recess defined by said parallel straight edges and the end edge thereof and by the parallel end edge of said valve forming a bleed port providing flow communication from said working space to the low pressure end of said casing, and with that portion of said recess defined by said parallel straight edges, the high pressure end wall and the end of said valve adjacent said end wall defining a radial high pressure port providing flow communication radially from the high pressure end of said working space, and with said axial high pressure port being located completely within an area extending between two limiting planes symmetrically located relative to a plane through the lines of intersection between said bores, with at least one of said limiting planes including one of said straight edges located at the greatest distance from said plane of symmetry and including the axis of the respective bore, and a closed chamber disposed in said valve with an opening therein for the supply of liquid under pressure which pressure is of at least the same magnitude as the pressure of the working fluid in the high pressure port.

39. Screw compressor apparatus as described in claim 38 in which the opening in said closed chamber is provided in the end of the slidable valve facing the bleed port.

40. In screw compressor apparatus of the character described having a casing with a working space disposed therein in the shape of two intersecting cylindrical bores with parallel axes, a high pressure end wall at one end thereof, a low pressure end wall at the other end thereof, intermeshing male and female rotors disposed in said working space in sealing engagement with said casing and the end walls thereof and having helical lands and intervening grooves with a wrap angle of less than 360°, said male rotor having the major portion of its lands and grooves outside the pitch circle thereof and with its flanks substantially convex, and said female rotor having the major portion of its lands and grooves inside the pitch circle thereof and with its flanks substantially concave, a low pressure port adjacent said low pressure wall, an axial high pressure port in said high pressure end wall with said ports being located substantially on opposite sides of a plane through the axes of said bores, low pressure channels in said casing in flow communication with said low pressure port and high pressure channels in said casing in flow communication with said high pressure port, the combination which comprises an axially extending recess disposed in said casing and extending from said high pressure end wall to a fixed end edge of said recess and being in flow communication with said high pressure channels, said recess and the wall of said working space intersecting along two straight edges parallel with the axes of said bores and on the same side of said plane through the axes of said bores, with at least one of said straight edges being disposed in the bore wall surrounding said female rotor, a valve axially movably disposed in said recess and in sealing engagement with the walls thereof and having an end edge disposed in parallel relation to the end edge of said recess, said valve having a profile on the surface thereof facing said working space corresponding thereto with the portion of said recess defined by said parallel straight edges and the end edge thereof and by the parallel end edge of said valve forming a bleed port providing flow communication from said working space to the low pressure end of said casing, and with that portion of said recess defined by said parallel straight edges, the high pressure end wall and the end of said valve adjacent said end wall defining a radial high pressure port providing flow communication radially from the high pressure end of said working space, and said axial high pressure port being limited by two outer edge portions, each extending generally radially from the wall of one bore to the bottom circle of the grooves of the corresponding rotor, and by an intermediate edge portion, at least the major section of each of said outer edge portions being brought into register with the trailing flank of the trailing land of a rotor groove in communication with the high pressure channel after the trailing edge of the corresponding land tip has been in register with the axially outermost point of the high pressure control edge of said valve when the valve is in such a position that said axially outermost point is located in the plane of the high pressure end wall of said working space, and a closed chamber disposed in said valve with an opening therein for the supply of liquid under pressure which pressure is of at least the same magnitude as the pressure of the working fluid in the high pressure port.

41. Apparatus as described in claim 40 in which said major sections of the outer edge portions of the said axial high pressure port are located within an area located between radial lines from the centers of the rotors to the trailing edge of the tip of the respective land, when the rotors are in the angular position corresponding to register in the plane of the high pressure end wall and with the axially outermost point of the high pressure control edge of the valve.

References Cited by the Examiner
UNITED STATES PATENTS

| | | | |
|---|---|---|---|
| 2,266,820 | 12/1941 | Smith | 230—143 |
| 2,287,716 | 6/1942 | Whitfield | 230—143 |
| 2,358,815 | 9/1944 | Lysholm | 230—143 |
| 2,459,709 | 1/1949 | Lysholm | 230—138 |
| 2,477,003 | 7/1949 | Paget | 230—138 |
| 2,504,230 | 4/1950 | Smith | 230—143 |
| 2,511,878 | 6/1950 | Rathman | 230—143 |
| 2,519,913 | 8/1950 | Lysholm | 230—143 |
| 2,580,006 | 12/1951 | Densham | 230—138 |
| 2,656,972 | 10/1953 | Rathman | 230—138 |
| 3,045,447 | 7/1962 | Wagenius | 230—138 |
| 3,088,659 | 5/1963 | Nilsson et al. | 230—143 |
| 3,108,739 | 10/1963 | Nilsson et al. | 230—138 |
| 3,151,806 | 10/1964 | Whitfield | 230—138 |

DONLEY J. STOCKING, *Primary Examiner.*

WILBUR J. GOODLIN, *Examiner.*